(12) United States Patent
Fritz (10) Patent No.: US 6,318,403 B1
(45) Date of Patent: Nov. 20, 2001

(54) COMBINATION MANIFOLD AND CHECK VALVE FOR A WATER HEATER

(76) Inventor: Sammy G. Fritz, P.O. Box 194, Frisco, TX (US) 75034

( * ) Notice: Subject to any disclaimer, the term of this patent is extended or adjusted under 35 U.S.C. 154(b) by 0 days.

(21) Appl. No.: 09/614,044

(22) Filed: Jul. 11, 2000

(51) Int. Cl.[7] .............................. F22D 1/14; F16K 15/03; F16K 15/04; F16K 17/24

(52) U.S. Cl. .................... 137/312; 122/504; 122/507; 137/2; 137/112; 137/113; 137/527.8; 137/533.11; 137/539; 137/605; 141/86; 220/571; 222/108

(58) Field of Search .................. 122/504, 507; 137/2, 12, 111, 112, 113, 527, 527.8, 533.11, 539, 605, 625.4, 625.44, 625.45, 625.48; 141/86; 220/571; 222/108, 491, 495

(56) References Cited

U.S. PATENT DOCUMENTS

| 315,521 | * | 4/1885 | Lord et al. ......................... 137/113 |
| 1,196,925 | * | 9/1916 | Boyer .................................. 137/605 |
| 1,491,986 | * | 4/1924 | Greene ............................... 137/605 |
| 1,686,310 | * | 10/1928 | Beebe ................................. 137/113 |
| 2,044,921 | * | 6/1936 | Swanland ........................... 137/112 |
| 2,106,822 | * | 2/1938 | White ................................. 137/112 |
| 2,225,840 | * | 12/1940 | Newton .............................. 137/112 |
| 2,358,228 | * | 9/1944 | Hoof ................................... 137/113 |
| 2,806,455 | * | 9/1957 | Birkemeier ........................ 122/504 |
| 3,069,671 | * | 12/1962 | Taylor ................................ 137/312 |
| 3,444,881 | * | 5/1969 | Harper ............................... 137/112 |
| 3,828,806 | * | 8/1974 | Glos, II .............................. 137/111 |
| 4,085,773 | | 4/1978 | Tinney ............................... 137/571 |
| 4,391,295 | | 7/1983 | Stipe ................................ 137/515.7 |
| 4,633,853 | | 1/1987 | Prill et al. ........................ 137/515.7 |
| 5,085,205 | | 2/1992 | Hall et al. ......................... 137/312 |
| 5,123,627 | | 6/1992 | Hodges ............................. 251/146 |
| 5,134,683 | | 7/1992 | Powell ............................... 137/312 |
| 5,279,319 | | 1/1994 | Fidelman ........................... 137/14 |
| 5,406,935 | | 4/1995 | Cinotto ............................. 251/144 |
| 5,437,300 | * | 8/1995 | Winnie et al. ..................... 137/112 |
| 5,632,302 | | 5/1997 | Lenoir, Jr. ......................... 137/312 |
| 5,794,609 | | 8/1998 | Grant ................................. 137/312 |
| 5,881,762 | * | 3/1999 | Janesky ............................. 137/312 |
| 5,971,003 | * | 10/1999 | Lyall .................................. 137/112 |
| 6,024,116 | | 2/2000 | Almberg et al. .................. 137/312 |
| 6,135,133 | * | 10/2000 | Ridgeway, Jr. ................... 137/312 |

FOREIGN PATENT DOCUMENTS

| 1009449 | * | 5/1957 | (DE) ................................. 137/111 |
| 1485028 | * | 4/1969 | (DE) ................................. 137/112 |
| 669667 | * | 10/1964 | (IT) .................................. 137/111 |
| 615759 | * | 1/1961 | (IT) .................................. 137/112 |

* cited by examiner

*Primary Examiner*—George L. Walton
(74) *Attorney, Agent, or Firm*—Howison, Chauza, Thoma, Handley & Arnott, L.L.P.

(57) ABSTRACT

The present invention disclosed and claimed herein comprises, in one aspect thereof, a combination manifold and check valve assembly for a water heater unit which includes a temperature and pressure relief valve and a drain pan. The assembly comprises a manifold body having a first inlet opening, a second inlet opening, and an outlet opening which are in fluid communication. The first inlet opening is adapted for connection to the outlet of a temperature and pressure relief valve. The second inlet opening is adapted for connection to the outlet of a drain pan. The outlet opening is adapted for connection to a drain line. A valve member is disposed within the manifold body between the first inlet opening and the second inlet opening. The valve member is movable between a first position wherein the valve member does not block fluid flow between the second inlet opening and the outlet opening, and a second position wherein the valve member blocks fluid flow between the first inlet opening and the second inlet opening and between the second inlet opening and the outlet opening. The valve member is urged into the first position when there is no significant fluid flow between the first inlet opening and the outlet opening. The valve member is urged into the second position when there is significant fluid flow between the first inlet opening and the outlet opening.

21 Claims, 5 Drawing Sheets

COMBINATION MANIFOLD AND CHECK VALVE FOR A WATER HEATER

TECHNICAL FIELD OF THE INVENTION

This invention is relates generally to plumbing fittings. In one aspect, it relates to a combination manifold and check valve for connecting the outlet lines of a water heater relief valve and drain pan.

BACKGROUND OF THE INVENTION

When a water heater is installed, in most applications a drain pan must be installed underneath the heater tank to catch water which leaks or spills from the tank. Also, there must be a temperature and pressure relief valve ("T&P valve") installed on the water heater which releases water from the tank if excessive water temperature or pressure occurs. This frequently results in the plumber having to run two drain pipes to the exterior of the building, one for the drain pan and one for the T&P valve. The reason for requiring separate drain pipes is to prevent water released from the T&P valve from backing up into and overflowing the drain pan if the T&P valve should begin discharging at a high rate. Obviously, running two separate drain lines from a water heater to the exterior of the building may significantly increase the cost of labor and materials necessary to install the water heater.

The plumbing codes of some localities allow the drain pan outlet line and the T&P valve outlet line to be connected together if a swing check valve is installed to protect the drain pan from overflow in case a significant discharge from the T&P valve outlet. The use of the swing check valve allows a single drain pipe to be run to the building exterior, thereby saving plumbing costs. However, experience indicates that swing check valves frequently do not allow water to drain properly from the drain pan. This is because the swinging valve member is normally in the closed position. When the water level in the drain pan is high enough, it forces the swing member open just enough to allow the water to seep through. Because the drain pan is unpressurized, the only pressure acting to open the swinging valve member results from the hydrostatic head of the water in the drain pan. Typically, this pressure amounts to only a few inches of hydrostatic head. If a large amount of water is spilled into the drain pan, this small amount of pressure may be insufficient to open the swing member enough to allow the water to escape fast enough to prevent the water from spilling over the top of the pan. In such cases, the only option available to the plumber is to run two separate pipes to the exterior of the building.

SUMMARY OF THE INVENTION

The present invention disclosed and claimed herein comprises, in one aspect thereof, a combination manifold and check valve assembly for a water heater unit which includes a temperature and pressure relief valve and a drain pan. The assembly comprises a manifold body having a first inlet opening, a second inlet opening, and an outlet opening which are in fluid communication. The first inlet opening is adapted for connection to the outlet of a temperature and pressure relief valve. The second inlet opening is adapted for connection to the outlet of a drain pan. The outlet opening is adapted for connection to a drain line. A valve member is disposed within the manifold body between the first inlet opening and the second inlet opening. The valve member is movable between a first position wherein the valve member does not block fluid flow between the second inlet opening and the outlet opening, and a second position wherein the valve member blocks fluid flow between the first inlet opening and the second inlet opening and between the second inlet opening and the outlet opening. The valve member is urged into the first position when there is no significant fluid flow between the first inlet opening and the outlet opening. The valve member is urged into the second position when there is significant fluid flow between the first inlet opening and the outlet opening.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
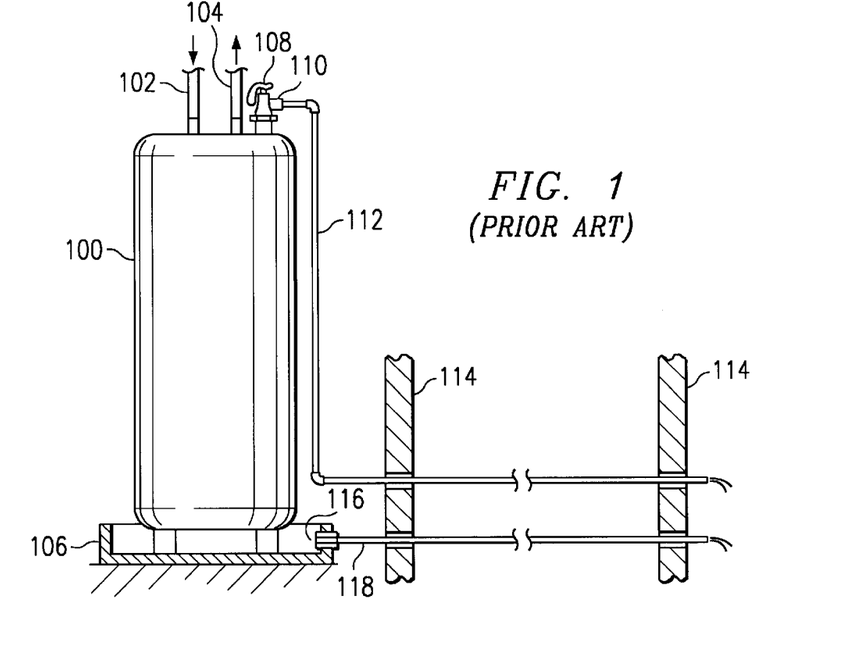
FIG. 1 illustrates the plumbing of a water heater T&P valve and drain pan using two separate drain lines according to the prior art.

Referring now to FIG. 1, there is illustrated the plumbing of a water heater according to the prior art. Water heater 100 is provided with cold water inlet 102 and hot water outlet 104. A drain pan 106 (shown in cross section) is provided beneath the water heater 100 to contain water which may leak or spill from the water heater tank. The water heater 100 is also equipped with a temperature and pressure relief valve 108 ("T&P valve") which will discharge water if the temperature or pressure within the water heater 100 becomes excessive. Since the water within water heater 100 is typically under significant pressure, the discharge from the T&P valve 108 may be substantial and prolonged, which could cause flooding within the building if not properly plumbed to the outside or another suitable drain. In the installation illustrated in FIG. 1, the outlet 110 of the T&P valve 108 is connected to drain pipe 112 which is routed through building walls 114 and ultimately discharges the water outside the building. The cost for installing the drain pipe 112 will depend upon factors such as the distance between the water heater and the outside, the number of building walls 114 which must be transited and the type of walls encountered (i.e., difficulty in boring through the walls).

Similarly, water accumulating in the drain pan 106 must be routed out of the building to prevent the drain pan from overflowing and flooding the building. Unlike the discharge from T&P valve 108, however, the water draining from drain pan 106 is not pressurized, rather it flows only due to the hydrostatic head resulting from water in the pan. Typically, the drain pan 106 is provided with an outlet opening 116 which is connected to a separate drain line 118 and routed through building walls 114 to the outside of the building. By using two seperate drain lines, the plumber ensures that a vigorous or prolonged discharge from the T&P valve 108 will not cause water to back up into the drain pan 106 and possibly flood the building. At the same time, however, running two separate drain lines may significantly increase the cost of installing the water heater.

Figure 2:
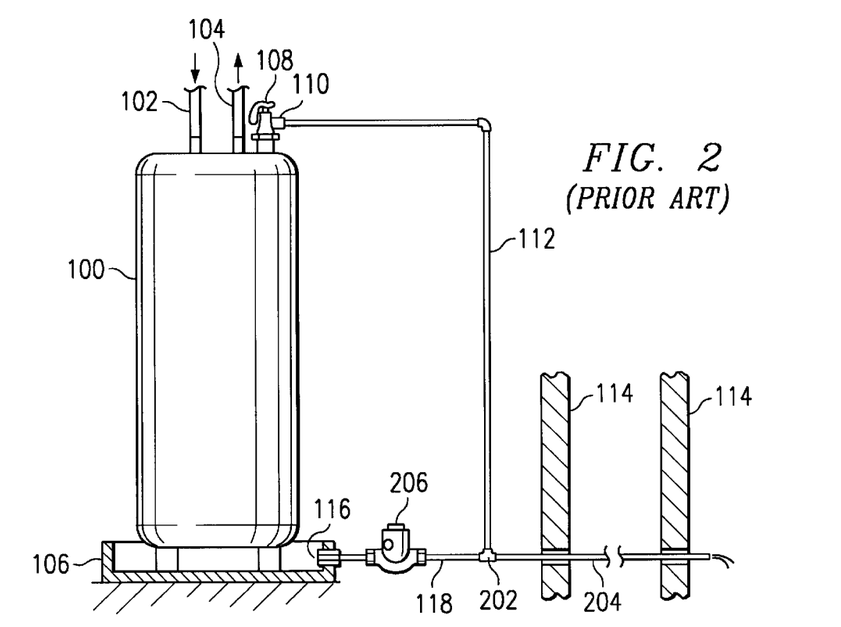
FIG. 2 illustrates the plumbing of a water heater T&P valve and drain pan using a swing check valve and a common drain pipe according to the prior art.

Referring now to FIG. 2, there is illustrated an alternative installation for a water heater in accordance with the prior art. In the installation illustrated in FIG. 2, the T&P valve drain line 112 and the drain pan drain line 118 are joined with a tee 202 and routed into a common drain line 204. By utilizing the common drain line 204, the cost of installing the drain lines is reduced compared to the two separate drain lines utilized in the installation of FIG. 1. However, to protect against water backflowing from the T&P valve drain line 112 and into the drain line 118 during discharge of the T&P valve (which could cause the drain pan to overflow and flood the building), plumbing codes may require installations using a common drain line to include a swing check valve 206 installed in the drain line between the pan outlet opening 116 and the tie in of the T&P valve drain pipe 112.

Figure 3:
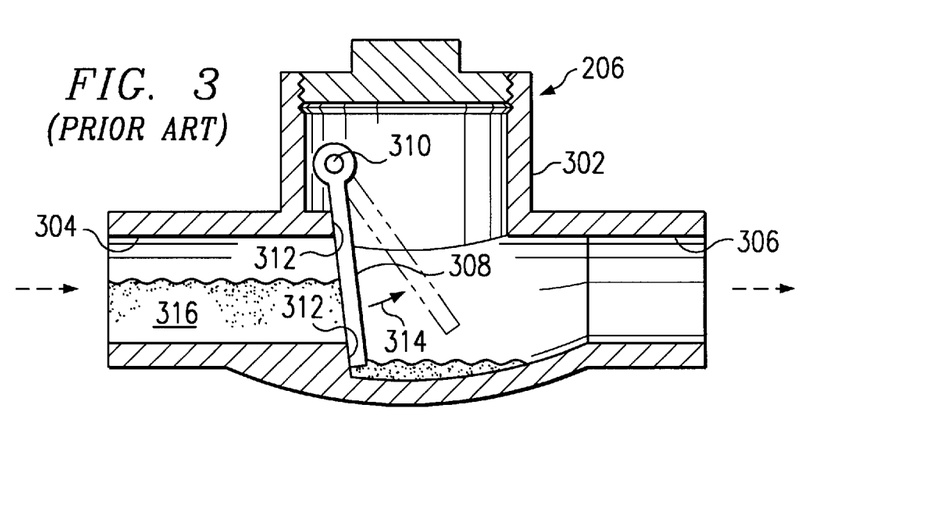
FIG. 3 illustrates a sectional view of a swing check view according to the prior art.

Referring now to FIG. 3, there is illustrated a swing check valve 206 in accordance with the prior art. The swing check valve 206 includes a valve body 302 defining an inlet opening 304 and an outlet opening 306 which are in fluid communication. A swinging valve member 308 is disposed inside the valve body and pivotally attached to a hinge 310 such that it can move between a closed position, wherein the valve member rests upon valve seats 312, thereby blocking reversed flow from the outlet opening 306 into the inlet opening 304, and an open position (denoted by the phantom line) wherein the swing member rotates as denoted by arrow 314 to allow forward fluid flow from the inlet opening to the outlet opening. It will be apparent that fluid pressure exerted on the inlet opening side of the swing member 308 will urge the swing member out of the closed position whereas fluid pressure exerted from the outlet opening side will urge the valve member to seal tightly against the valve seats and cut off flow through the valve.

It has been determined that use of a conventional swing check valve 206 in a water heater installation according to the prior art as illustrated in FIG. 2 may result in operational problems. This is frequently caused because the very low pressures produced by the hydrostatic in the drain pan 106 is insufficient to overcome the frictional, gravitational, and/or spring forces which tend to keep the valve member 308 in the closed position. Thus, for example, water 316 in the inlet portion of valve 206 may produce insufficient force to cause the swing 308 to open, or it may open just enough to allow the water to seep through as illustrated in FIG. 3. In addition, if a swing check valve 206 is infrequently used, the swinging member 308 may become corroded or otherwise fouled by deposits from the water causing it to stick in the closed position. Thus, the restriction represented by the swing check valve 206 to the flow of water through drain line 118 may result in water not being able to drain from the drain pan 106 or not escaping fast enough, causing the pan to overflow and flood the building. The only option heretofore available to solve this situation is the use of dual drain lines as illustrated in FIG. 1.

Figure 4:
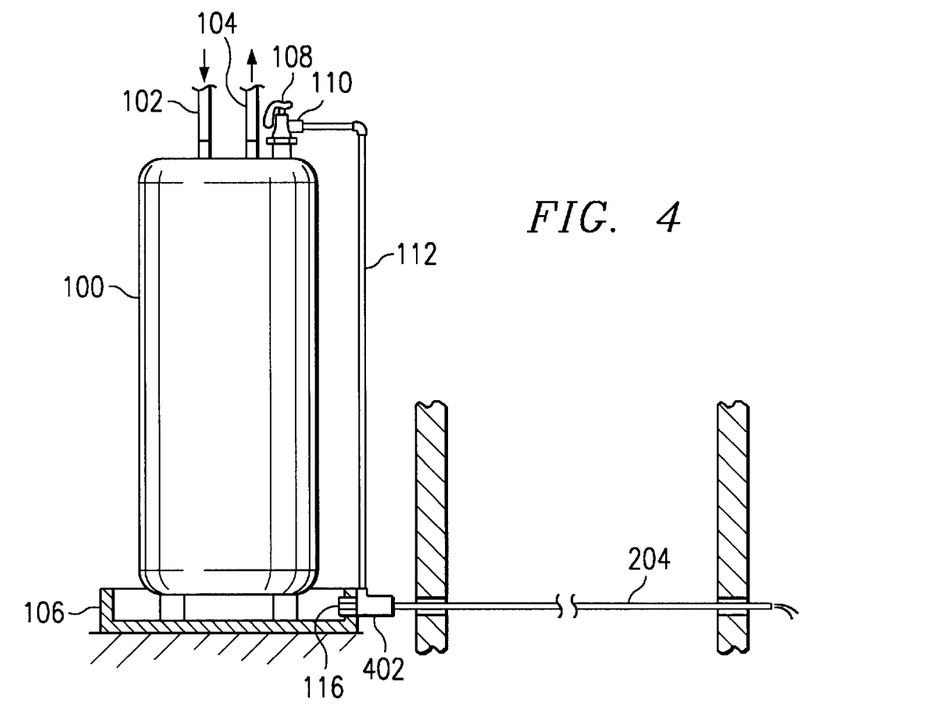
FIG. 4 illustrates the plumbing of a water heater T&P valve and drain pan using a combination manifold and check valve according to one embodiment of the current invention.

Referring now to FIG. 4, there is illustrated a water heater installation utilizing a combined manifold and check valve assembly in accordance with one embodiment of the current invention. The manifold and check valve assembly (hereinafter "MCVA") 402 is plumbed to the T&P valve outlet line 112 and to the outlet 116 of the drain pan 106. A common drain line 204 extends from the MCVA 402 to the outside of the building or to the location of another suitable drain.

Figure 5:
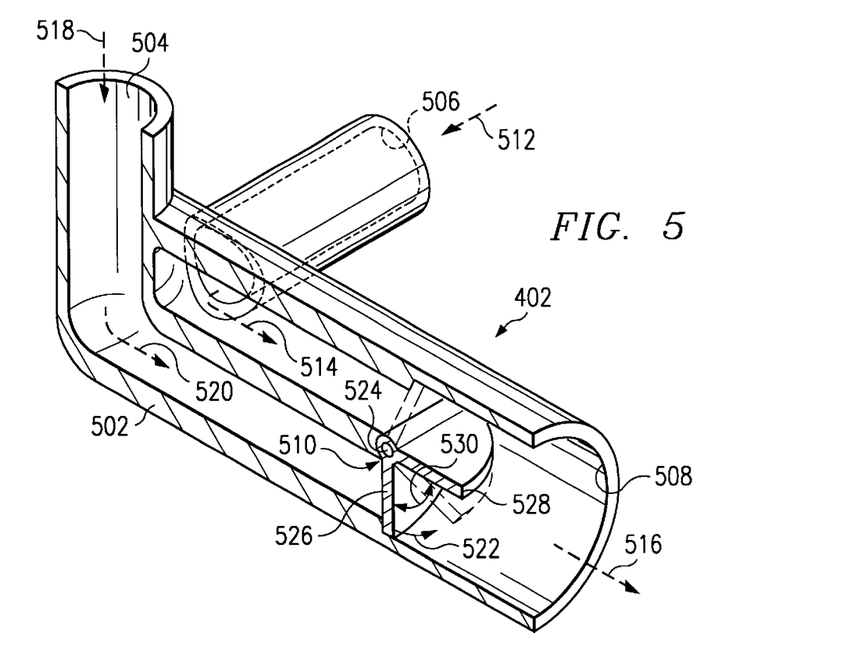
FIG. 5 illustrates a perspective view, with portions broken away to show the interior structure, of a combination manifold and check valve according to an embodiment of the current invention.

Referring now to FIG. 5, there is illustrated a combination manifold and check valve assembly according to one embodiment of the current invention. In FIG. 5, portions of the assembly have been broken away to better illustrate the internal structure. The MCVA 402 includes a manifold body 502 having a first inlet opening 504, a second inlet opening 506, and an outlet opening 508 which are in fluid communication. The first inlet opening 504 is adapted for connection to the outlet line 112 (FIG. 4) of a T&P valve. Such adaptation may include, for example, providing a threaded socket, or a socket for soldering or gluing, depending upon the materials used for the manifold and connecting pipes. The second inlet opening 506 is adapted for connection to the outlet 116 (FIG. 4) of a drain pan 106. It will be apparent that the second inlet opening 506 of the MCVA 402 may be connected directly to the outlet 116 of the drain pan, or alternately, it may be connected by a short length of pipe. The outlet opening 508 is adapted for connection to a common drain line 204.

A valve member 510 is disposed within the manifold body 502 between the first inlet opening 504 and the second inlet opening 506. The valve member 510 is movable between a first position (shown in solid line in FIG. 5) wherein the valve member does not block fluid flow between the second inlet opening 506 and the outlet opening 508, and a second position (shown in phantom in FIG. 5) wherein the valve member blocks fluid flow between the first inlet opening 504 and the second inlet opening and further blocks flow between the second inlet and the outlet opening. The valve member 510 is urged into the first position when there is no significant fluid flow between the first inlet opening 504 and the outlet opening 508, and the valve member is urged into the second position when there is significant fluid flow between the first inlet opening and the outlet opening. Stated another way, during normal operation of the water heater system (i.e., no discharge from the T&P valve 108) the valve member 510 will remain in the first position, and it will only move into the second position when there is significant flow from the T&P valve. As a result, water will normally be free to flow from the drain pan 106 and enter the second inlet opening 506 as indicated by arrow 512. This drain pan water will flow through the manifold body as indicated by arrow 514 and past the valve member 510 which does not block or substantially impede the flow which continues out outlet 508 as indicated by arrow 516 and into the common drain line (not shown). However, when the T&P valve is activated, water will flow down the T&P drain line 112 entering MCVA 402 through the first inlet opening 504 as indicated by arrow 518. This flow will continue through the manifold body 502 as indicated by arrow 520 until it encounters the valve member 510. The force of the flow 520, which is generally pressurized water if the T&P valve has been activated, forces the valve member 510 to move from the first position into the second position as indicated by arrow 522. This allows the flow 520 to proceed past the valve member 510 and exit the manifold body 502 by means of outlet opening 508 as indicated by arrow 516. It will be noted that when the valve member 510 is in the second position (shown by phantom line) the water flow 520 from the T&P valve cannot back flow into the drain pan 106 and thereby cause flooding of the building by overflowing the drain pan.

In the embodiment shown in FIG. 5, the valve member 510 comprises a swinging member rotatably mounted on a hinge, however other methods of mounting a valve member to allow movement between a first and second position may be used. Further, in the embodiment shown in FIG. 5, the valve member is urged into the first position by the force of gravity, i.e., the weight of the valve member will move it into the first position in the absence of significant fluid pressure from the T&P valve flow path. Utilizing gravity to position the valve member 510, will, of course, require that the manifold body 502 be specifically oriented during installation, however this can be easily accomplished by providing the installer with appropriate instructions. Alternately, the valve member 510 may be urged into the first position by the use of springs or other mechanisms well known in the art.

Referring still to FIG. 5, the swinging member 510 in this embodiment includes first and second plates 526, 528 respectively, joined to one another at the hinge 524 and forming an angle (denoted by reference numeral 530) with respect to one another. When the valve member 510 is in the first position, the first plate 526 blocks fluid flow between the first inlet opening 504 and the second inlet opening 506 and between the first inlet opening and outlet opening 508, and the second plate 528 does not block fluid flow between the second inlet opening and the outlet opening. When the valve member is in the second position, however, the second plate 528 blocks fluid flow between the first inlet opening 504 and the second inlet opening 506 and the between the outlet opening 508 and the second inlet opening, and the first plate does not block fluid flow between the first inlet opening and the outlet opening. This arrangement provides for minimal obstruction of the flow 514 from the drain pan during normal operation (i.e. when the T&P valve is not discharging), while at the same time providing protection against back flow into the drain pan when the T&P valve does discharge.

Figure 6:
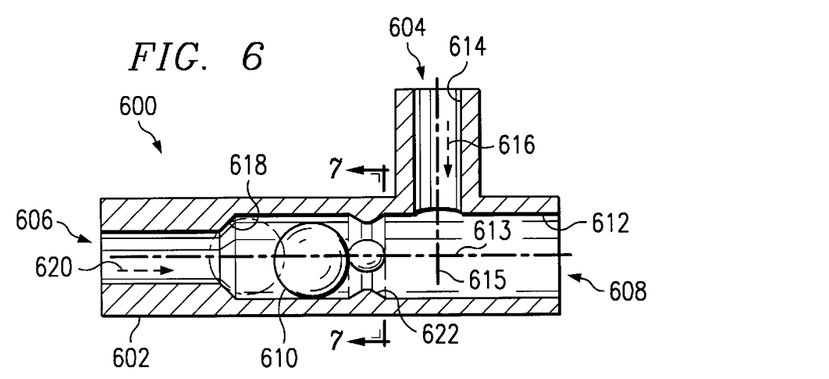
FIG. 6 shows a cross sectional view of a combination manifold and check valve assembly according to another embodiment.

Referring now to FIG. 6, there is illustrated an alternate embodiment of a combined manifold and check valve assembly. The MCVA illustrated in FIG. 6 is particularly suited for use in localities in which the plumbing code or plumbing practice does not the imposition of any valve element along the flow path between the T&P valve and the drain. The MCVA 600 includes a manifold body 602 having a first inlet opening 604, a second inlet opening 606 and an outlet opening 608 which are in fluid communication and adapted for connection to a T&P valve outlet 112, drain pan outlet 116 and common drain line 204, respectively, as previously described. A valve member 610 is disposed within the manifold body 602 between the first inlet opening 604 and the second inlet opening 606. In this embodiment, the valve member 610 is a ball, i.e., a spherical shaped member. The manifold body 602 in this embodiment forms a first bore 612 between the second inlet opening 606 and the outlet opening 608 and forms a second bore 614 between the first inlet opening 604 and the first bore 612, the axes of the first and second bores 613, 615, respectively, intersecting one another at a point downstream of the valve member 610. The valve member 610 is movable between a first position (shown by solid line) wherein fluid flow is not blocked between the second inlet opening 606 and the outlet opening 608, and a second position (shown by dotted line) wherein the valve member blocks fluid flow between the first inlet opening 604 and the second inlet opening and between the second inlet opening and the outlet opening. In other words, significant flow from the T&P valve (indicated by arrow 616) arriving in first bore 612 downstream of the valve member 610, would cause the valve member to move into the second position (shown in dotted line) and seal against the seat surface 618 formed by a reduction in the diameter of bore 612 upstream of the valve member. Once the T&P valve flow is reduced, the ball-shaped valve member 610 will roll away from the seat 618 and allow water to flow with minimal obstruction from the drain pan as indicated by arrow 620. The valve member 610 is prevented from moving too far downstream by guard members 622 which project radially inward from the walls of the bore 612.

Figure 7:
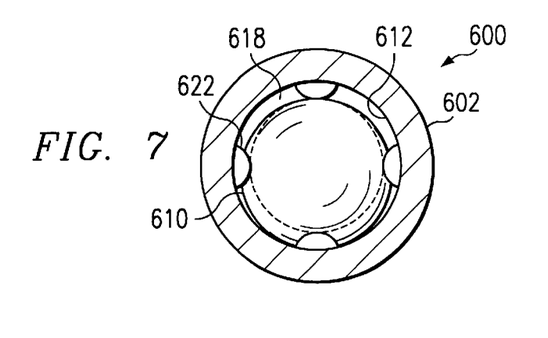
FIG. 7 illustrates a cross-sectional end view of the assembly of FIG. 6 taken along line 7—7 in FIG. 6.

Referring now also to FIG. 7, there is illustrated a cross sectional end view of the MCVA 600 taken along line 7—7 of FIG. 6. This view illustrates how the ball shaped valve member 610 is retained the bore 612 between the seating surface 618 and guard members 622 and further shows the annular area between the valve member and the bore 612 through which water can flow as it drains from the drain pan.

Figure 8:
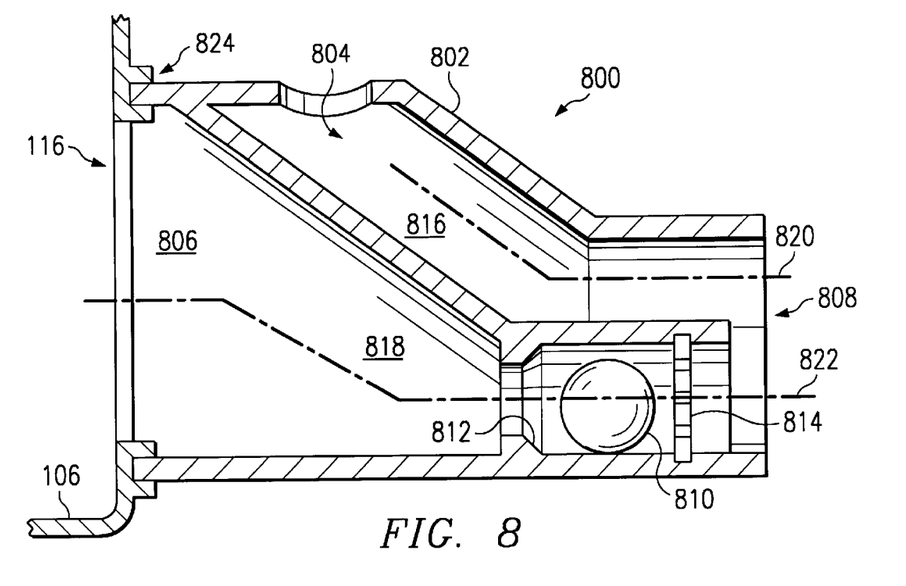
FIG. 8 illustrates a cross sectional view of a combination manifold and check valve assembly according to another embodiment.

Referring now to FIG. 8, there is illustrated another embodiment of a combination manifold and check valve assembly. MCVA 800 includes a manifold body 802 having a first inlet opening 804, a second inlet opening 806 and an outlet opening 808 which are in fluid communication and adapted for connection to the T&P valve outlet line 112, drain pan outlet 116, and common drain line 204, respectively, as previously described. A valve member 810 is disposed within the manifold body 802 between the first inlet opening 804 and the second inlet opening 806. The valve member 810, which in this embodiment is a ball, functions as described for the embodiment illustrated in FIGS. 6 and 7, i.e., it is movable between a first position as illustrated in FIG. 8, wherein the valve member does not block fluid flow between the second inlet opening 806 and the outlet opening 808, and a second position (not shown, with the valve member pushed against the seating surfaces 812) wherein the valve member blocks fluid flow between the first inlet opening 804 and the second inlet opening and between the second inlet opening and the outlet opening. In this embodiment, the valve member 810 is retained in place on the downstream side by a guard member 814 which has circumferentially spaced radial projections which limit the downstream movement of the valve member while allowing water to flow freely around the valve member even if it is pushed up against the guard member. In this embodiment, the manifold body 802 forms a first fluid passage 816 between the first inlet opening 804 and the outlet opening 808, and forms a second fluid passage 818 between the second inlet opening 806 and the outlet opening. The respective axes 820, 822 of the first and second fluid passages 816, 818 are substantially parallel at the outlet opening 808 of the manifold body. This configuration routes water discharged from the T&P valve past the end of, and away from, the outlet of the second fluid passage 822, which may produce a substantial venturi effect assisting in the drainage of water from the drain pan 106. In this embodiment, the first fluid passage 816 is disposed above the second fluid passage 818 thereby insuring that the second fluid passage is at the lowest possible level so as to maximize the hydrostatic head inducing water to flow from the drain pan 106.

In the embodiment illustrated in FIG. 8, the manifold body 802 is joined directly to the drain pan 106 such that the drain pan outlet 116 and MCVA second inlet 806 constitute a single opening. In the embodiment illustrated, the MCVA 800 is joined to the drain pan 106 using a socket joint 824 which could be glued or soldered as appropriate. In alternate embodiments, the MCVA 800 could be joined to the drain pan 106 by threaded members, or by a short length of connecting pipe. In yet another embodiment, further described below, the MCVA 800 could be manufactured as an integral part of drain pan 106.

Figure 9:
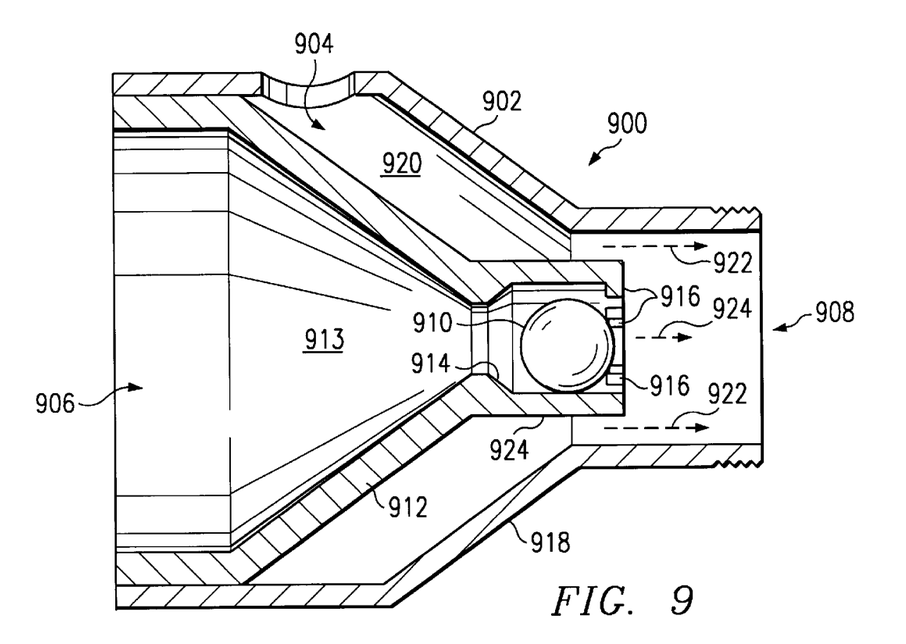
FIG. 9 illustrates a cross sectional view of a combination manifold and check valve assembly according to yet another embodiment.

Referring now to FIG. 9, there is illustrated yet another embodiment of a combined manifold and check valve assembly. The MCVA 900 includes a manifold body 902, first inlet opening 904, second inlet opening 906 and outlet opening 908 as previously described. In this embodiment, a funnel shaped inner member 912 forms a first fluid passage 913 between the second inlet opening 906 and the outlet opening 908. The inner member 912 mounts a movable valve member 910 disposed between the second inlet opening 906 and the outlet opening 908. In this embodiment, the valve member 910 is ball shaped and functions as described in the previous embodiments illustrated in FIGS. 6–8, i.e., moving between an upstream seating surface 914 (i.e. the second position) downstream to guard members 916 which prevent escape of the ball but allow water to flow freely whenever the valve member is in the first position (i.e. not sealed against seat 914). The manifold body 902 further comprises a funnel shaped outer member 918 which is connected to the inner member 912 forming an annular space 920 therebetween. The annulus 920 constitutes a second fluid passage which extends between the first inlet opening 904 and the outlet opening 908. In this embodiment, if a significant discharge of water from the T&P valve 108 is received through first inlet 904, it will be discharged from the annular space 920 in a stream surrounding and parallel to the nozzle portion 924 of the inner member 912. This flow 922 may produce a venturi effect which will assist in drawing water into second inlet 906 so as to drain any water which is present in the drain pan 106. If however, water backs up in the common drain line 204 (not shown) connected to outlet 908, valve member 910 will move into the second position (i.e., against seat 914) to prevent water from flowing into the drain pan 106.

Figure 10:
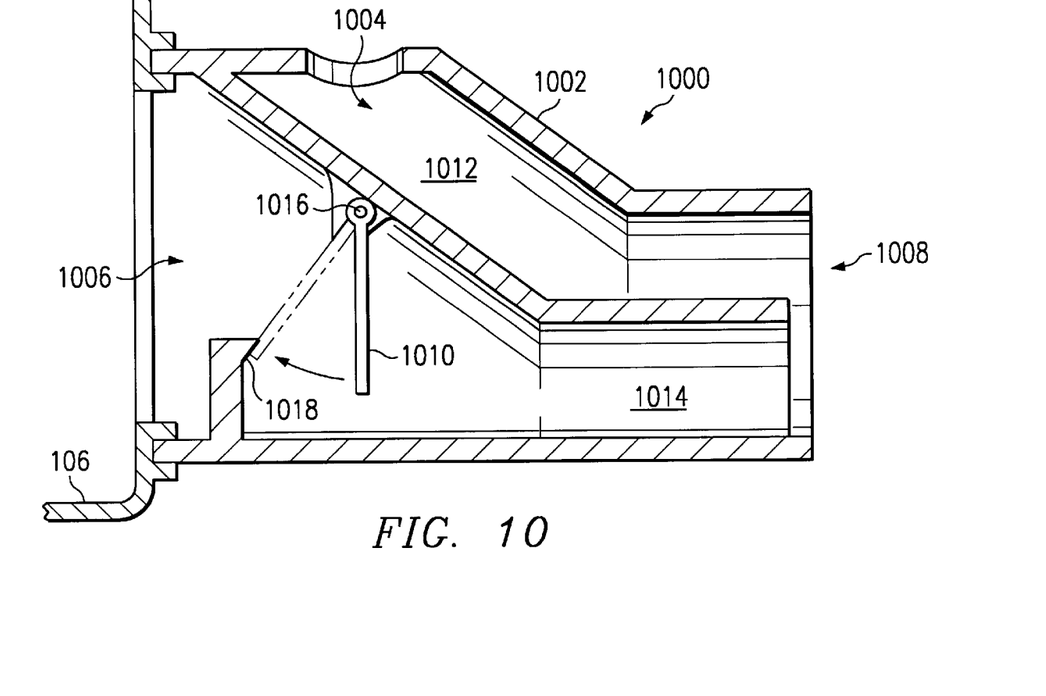
FIG. 10 shows a cross sectional view of a combination manifold and check valve assembly according to a further embodiment.

Referring now to FIG. 10, there is illustrated yet another embodiment of a combined manifold and check valve assembly. The MCVA 1000 includes a manifold body 1002, a first inlet opening 1004, a second inlet opening 1006 and an outlet opening 1008 as previously described. The manifold body 1002 defines a first flow passage 1012 between the first inlet opening 1004 and the outlet 1008 and a second flow path 1014 between the second inlet opening 1006 and the outlet opening. A valve member 1010 is disposed within the manifold body 1002 between the first inlet opening 1004 and the second inlet opening 1006. The valve member 1010 is movable between a first position (shown in solid line) and a second position (shown in dotted line) to block fluid flow between the first inlet opening 1004 and the second inlet opening 1006 when there is significant fluid flow between the first inlet opening and the outlet opening (i.e., when there is a significant discharge from the T&P valve). In the embodiment shown, the valve member 1010 is a plate which is rotatably attached to a hinge 1016. The position of the hinge 1016 and the seat surface 1018 are selected such that the force of gravity will urge the valve member 1010 into the first position. Thus, that the flow of water from the second inlet 1006 to the outlet 1008 is not restricted in the absence of a significant T&P valve discharge. The embodiment of FIG. 10 is otherwise substantially similar to that previously illustrated in FIG. 8.

Figure 11:
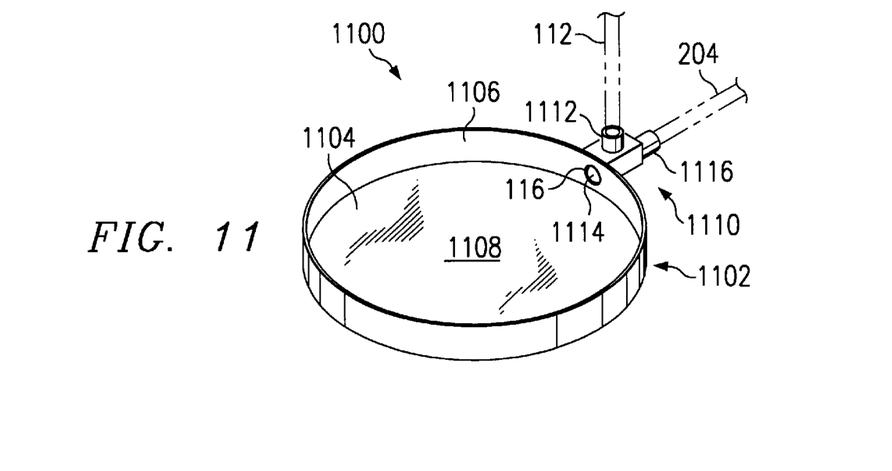
FIG. 11 shows a drain pan assembly in accordance with another aspect of the current invention.

Referring now to FIG. 11, there is illustrated a drain pan assembly for a water heater unit in accordance with another aspect of the current invention. The drain pan assembly 1100 includes a pan body 1102 having a bottom 1104 and a continuous rim 1106 extending upward from the periphery of the bottom to form a reservoir 1108. The pan body 1102 is adapted for placement underneath the tank of a water heater (not shown) according to common practice. The rim 1106 has a reservoir outlet 116 formed therethrough for draining water which may accumulate in the reservoir 1108. A manifold body 1110 is connected to the pan body 1102, the manifold body having a first inlet opening 1112, a second inlet opening 1114 and an outlet opening 1116. The first inlet opening 1112 is adapted for connection to the outlet line 112 (shown in phantom) of a T&P valve. The second inlet opening 1114 is fluidly connected to the reservoir outlet 116 of the pan body 1102. The outlet opening 1116 is adapted for connection to a common drain line 204 (shown in phantom). The manifold body 1110 of the pan assembly 1100 includes a movable valve member and other internal structures which are substantially identical to those of the MCVA which were previously described and illustrated in FIGS. 5 though 10 and, for the sake of brevity, will not be repeated here. It will be readily appreciated, however, that each of the various configurations and features of the MCVA previously described and illustrated can be incorporated into the manifold body 1110 of the drain pan assembly 1100. In another embodiment of this aspect, both the pan body 1102 and the manifold body 1110 are formed of molded plastic material. Such material may be any plastic material which is amenable to molding including thermosetting and thermoforming, resins, epoxies, and including fiber reinforced composites such as fiberglass. In an alternative embodiment, the pan body 1102 and the manifold body 1110 is manufactured as an integral unit.

In accordance with another aspect of the current invention, a method for connecting an outlet of a water heater temperature and pressure relief valve and an outlet of a water heater drain pan to a common drain line is provided. The method comprises the following steps: first, connecting the outlet of a water heater temperature and pressure relief valve to a first inlet opening of a manifold body having a first inlet opening, a second inlet opening and an outlet opening which are in fluid communication. Second, connecting the outlet of a water heater drain pan to the second inlet opening of the manifold body. Third, connecting a common drain line to the outlet opening of the manifold body. The previous three steps may be performed in any order. Further, the method includes providing a valve member disposed within the manifold body between the first inlet opening and the second inlet opening, wherein the valve member is movable between a first position in which the valve member does not block fluid flow between the second inlet opening and the outlet opening, and a second position wherein the valve member blocks fluid flow between the first inlet opening and the second inlet opening and between the second inlet opening and the outlet opening. It is further required that the valve member is urged into the first position when there is no significant fluid flow between the first inlet opening and the outlet opening and the valve member is urged into the second position when there is significant fluid flow between the first inlet opening and the outlet opening. It will be readily apparent that a method in accordance with this aspect of the current invention may be practiced using a combined manifold and check valve assembly as previously described and illustrated in FIGS. 4 through 10, or a drain pan assembly as previously described and illustrated in FIG. 11, and all variations of this method incorporating the various MCVA and drain pans assemblies so described are contemplated. Accordingly, in another embodiment of this method, the water heater drain pan and the manifold body are manufactured as an integral unit. In yet another embodiment, the method utilizes a valve member which is a swinging member rotatably disposed on a hinge. In yet another embodiment, the method utilizes a valve member which is a ball.

Although the preferred embodiment has been described in detail, it should be understood that various changes, substitutions and alterations can be made therein without departing from the spirit and scope of the invention as defined by the appended claims.

What is claimed is:

1. A combination manifold and check valve assembly comprising:
    a manifold body having a first inlet opening, a second inlet opening, and an outlet opening which are in fluid communication,
        the first inlet opening being directly connected to the outlet of a temperature and pressure relief valve mounted on a water heater,
        the second inlet opening being directly connected to the outlet of a drain pan, the drain pan being disposed in a location to collect water leaking from the water heater and the outlet of the drain pan being disposed at a predetermined height, and
        the outlet opening being adapted for connection to a drain line;
    a valve member disposed within the manifold body between the first inlet opening and the second inlet opening and being movable between a first position wherein the valve member does not block fluid flow between the second inlet opening and the outlet opening, and a second position wherein the valve member blocks fluid flow between the first inlet opening and the second inlet opening and between the second inlet opening and the outlet opening
    wherein the valve member is urged into the first position when there is no significant fluid flow from the temperature and pressure relief valve, whereby water can then flow through the manifold from the drain pan to the outlet opening when the. water level in the drain pan is above the predetermined height; and
    wherein the valve member is urged into the second position when there is significant fluid flow from the temperature and pressure relief valve, whereby water can then flow through the manifold from the pressure relief valve to the outlet opening regardless of the water level in the drain pan.

2. An assembly in accordance with claim 1, wherein the valve member is urged into the first position by the force of gravity.

3. An assembly in accordance with claim 2, wherein the valve member is a swinging member rotatably disposed on a hinge.

4. An assembly in accordance with claim 3, wherein the swinging member includes first and second plates joined to one another at the hinge and forming an angle with respect to one another;
    whereby when the valve member is in the first position, the first plate blocks fluid flow between the first inlet opening and the second inlet opening and between the first inlet opening and the outlet opening, and the second plate does not block fluid flow between the second inlet opening and the outlet opening; and
    whereby when the valve member is in the second position, the second plate blocks fluid flow between the first inlet opening and the second inlet opening and between the outlet opening and the second inlet opening and the first plate does not block fluid flow between the first inlet opening and the outlet opening.

5. An assembly in accordance with claim 1, wherein the valve member is a ball.

6. An assembly in accordance with claim 5, wherein the manifold body forms a first bore between the second inlet opening and the outlet opening and wherein the manifold body forms a second bore between the first inlet opening and the first bore, the axes of the first and second bores intersecting one another downstream of the valve member.

7. An assembly in accordance with claim 5, wherein the manifold body forms a first fluid passage between the first inlet opening and the outlet opening and wherein the manifold body forms a second fluid passage between the second inlet opening and the outlet opening, the axes of the first and second fluid passages being substantially parallel at the outlet opening.

8. An assembly in accordance with claim 7, wherein the first fluid passage is disposed above the second fluid passage.

9. An assembly in accordance with claim 5, wherein the manifold body further comprises:
    an funnel-shaped inner member forming a first fluid passage between the second inlet opening and the outlet opening, the inner member including the ball valve member disposed between the second inlet opening and the outlet opening;
    an outer funnel-shaped member connected to the inner funnel-shaped member to form an annulus therebetween, the annulus forming a second fluid passage between the first inlet opening and the outlet opening.

10. A drain pan assembly for a water heater comprising:
    a pan body having a bottom and a continuous rim extending upward from the periphery of the bottom to form a reservoir, the pan body being disposed to collect water leaking from the tanks of a water heater, the rim having a reservoir outlet formed therethrough at a predetermined height for draining water from the reservoir;
    a manifold body connected to the pan body, the manifold body having a first inlet opening, a second inlet opening, and an outlet opening which are in fluid communication, the first inlet opening being directly connected to the outlet of a temperature and pressure relief valve mounted on the water heater, the second inlet opening being fluidly connected to the reservoir outlet of the pan body, and the outlet opening being adapted for connection to a drain line;
    a valve member disposed within the i manifold body between the first inlet opening and the second inlet opening and being movable between a first position wherein the valve member does not block fluid flow between the second inlet opening and the outlet opening, and a second position wherein the valve member blocks fluid flow between the first inlet opening and the second inlet opening and between the second inlet opening and the outlet opening;

wherein the valve member is urged into the first position when there is no significant fluid flow from the temperature and pressure relief valve, whereby water can then flow through the manifold from the drain pan of the outlet opening when the water level in the reservoir is above the predetermined height; and wherein the valve member is urged into the second position when there is significant fluid flow from the temperature and pressure relief valve, whereby water can then flow through the manifold from the pressure relief valve to the outlet opening regardless of the water level in the reservoir.

11. A drain pan assembly in accordance with claim 10, wherein the valve member is urged into the first position by the force of gravity.

12. A drain pan assembly in accordance with claim 11, wherein the valve member is a swinging member rotatably disposed on a hinge.

13. A drain pan assembly in accordance with claim 12, wherein the swinging member includes first and second plates joined to one another at the hinge and forming an angle with respect to one another;

whereby when the valve member is in the first position, the first plate blocks fluid flow between the first inlet opening and the second inlet opening and between the first inlet opening and the outlet opening, and the second plate does not block fluid flow between the second inlet opening and the outlet opening; and whereby when the valve member is in the second position, the second plate blocks fluid flow between the first inlet opening and the second inlet opening and between the outlet opening and the second inlet opening and the first plate does not block fluid flow between the first inlet opening and the outlet opening.

14. A drain pan assembly in accordance with claim 10, wherein the valve member is a ball.

15. A drain pan assembly in accordance with claim 10, wherein the pan body and manifold body are manufactured as an integral unit.

16. A drain pan assembly in accordance with claim 15, wherein the pan body and manifold body are formed of molded plastic.

17. A drain pan assembly in accordance with claim 10, wherein the pan body and manifold body are manufactured of molded plastic.

18. A method for connecting an outlet of a water heater temperature and pressure relief valve and an outlet of a water heater drain pan to a common drain line, comprising the steps:

connecting the outlet of a water heater temperature and pressure relief valve directly to a first inlet opening of a manifold body having the first inlet opening, a second inlet opening, and an outlet opening which are in fluid communication;

connecting the outlet of a water heater drain pan directly to the second inlet opening of the manifold body, the drain pan being disposed in a location to collect water leaking from a water heater and the outlet of the drain pan being disposed at a predetermined height;

connecting a common drain line to the outlet opening of the manifold body;

providing a valve member disposed within the manifold body between the first inlet opening and the second inlet opening;

wherein the valve member is movable between a first position wherein the valve the member does not block fluid flow between the second inlet opening and the outlet opening, and a second position wherein the valve member blocks fluid flow between the first inlet opening and the second inlet opening and between the second inlet opening and the outlet opening;

wherein the valve member is urged into the first position when there is no significant fluid flow from the temperature and pressure relief valve, whereby water can then flow through the manifold from the drain pan to the outlet opening when the water level in the drain pan is above the predetermined height; and wherein the valve member is urged into the second position when there is significant fluid flow from the temperature and pressure relief valve, whereby water can then flow through the manifold from the pressure relief valve to the outlet opening regardless of the water level in the drain pan.

19. A method in accordance with claim 18, wherein the water heater drain pan and the manifold body are manufactured as an integral unit.

20. A method in accordance with claim 18, wherein the valve member is a swinging member rotatably disposed on a hinge.

21. A method in accordance with claim 18, wherein the valve member is a ball.

* * * * *